(12) United States Patent
Mizuno et al.

(10) Patent No.: US 10,807,568 B2
(45) Date of Patent: Oct. 20, 2020

(54) CLEANING APPARATUS

(71) Applicant: AISIN SEIKI KABUSHIKI KAISHA, Kariya-shi, Aichi-ken (JP)

(72) Inventors: Taichi Mizuno, Anjo (JP); Hidetoshi Inayoshi, Nukata-gun (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 254 days.

(21) Appl. No.: 16/102,917

(22) Filed: Aug. 14, 2018

(65) Prior Publication Data
US 2019/0061698 A1 Feb. 28, 2019

(30) Foreign Application Priority Data

Aug. 28, 2017 (JP) ................... 2017-163528
Oct. 20, 2017 (JP) ................... 2017-203213

(51) Int. Cl.
| | |
|---|---|
| *B60S 1/08* | (2006.01) |
| *B05B 7/08* | (2006.01) |
| *B08B 3/02* | (2006.01) |
| *B08B 5/04* | (2006.01) |
| *B60S 1/56* | (2006.01) |
| *B60S 1/52* | (2006.01) |
| *B60S 1/54* | (2006.01) |
| *G02B 27/00* | (2006.01) |

(52) U.S. Cl.
CPC .......... *B60S 1/0848* (2013.01); *B05B 7/0815* (2013.01); *B08B 3/02* (2013.01); *B08B 5/04* (2013.01); *B60S 1/56* (2013.01); *B60S 1/52* (2013.01); *B60S 1/54* (2013.01); *G02B 27/0006* (2013.01)

(58) Field of Classification Search
CPC . B05B 7/0815; B08B 3/02; B08B 5/04; B60S 1/0848; B60S 1/52; B60S 1/54; B60S 1/56; G02B 27/0006
See application file for complete search history.

(56) References Cited

U.S. PATENT DOCUMENTS 9,505,382 B2 * 11/2016 Gokan ................. B60S 1/0848
9,663,073 B2 * 5/2017 Tanaka ..................... B60S 1/56
(Continued)

FOREIGN PATENT DOCUMENTS

| JP | 2014-019403 A | 2/2014 |
|---|---|---|
| JP | 2015-224032 A | 12/2015 |

(Continued)

*Primary Examiner* — Marc Carlson
(74) *Attorney, Agent, or Firm* — Sughrue Mion PLLC

(57) ABSTRACT

A cleaning apparatus includes a fluid discharge portion discharging fluid to a cleaning object, a gas discharge portion jetting gas to the cleaning object, a fluid tank, a fluid pump supplying the fluid via a fluid passage, a gas pump supplying gas via a gas passage, a control unit, a housing at which a part of the fluid passage and a part of the gas passage are provided, and a valve element switchable between a closed position at which the gas passage is blocked and an open position at which the gas passage is opened, the valve element including a first surface receiving a fluid pressure in a direction where the valve element is brought to the closed position and including a second surface receiving a gas pressure in a direction where the valve element is brought to the open position in a state where the valve element is closed.

13 Claims, 10 Drawing Sheets

(56) References Cited

U.S. PATENT DOCUMENTS

| | | | |
|---|---|---|---|
| 10,252,703 B2* | 4/2019 | Ina | G02B 27/0006 |
| 2015/0183406 A1* | 7/2015 | Tanaka | B60R 1/00 |
| | | | 134/99.1 |
| 2017/0021809 A1* | 1/2017 | Trebouet | B60S 1/0848 |
| 2017/0182980 A1* | 6/2017 | Davies | B60S 1/54 |
| 2017/0313286 A1* | 11/2017 | Galera | B60S 1/52 |
| 2019/0126891 A1* | 5/2019 | Kondo | B60R 16/08 |
| 2019/0217823 A1* | 7/2019 | Giraud | B60S 1/528 |
| 2019/0270432 A1* | 9/2019 | Ina | B60S 1/522 |

FOREIGN PATENT DOCUMENTS

| | | | |
|---|---|---|---|
| JP | 2017-024713 A | | 2/2017 |
| JP | 2018034647 A | * | 3/2018 |
| WO | 2014/010578 A1 | | 1/2014 |

\* cited by examiner

CLEANING APPARATUS

CROSS REFERENCE TO RELATED APPLICATIONS

This application is based on and claims priority under 35 U.S.C. § 119 to Japanese Patent Application 2017-163528, filed on Aug. 28, 2017 and Japanese Patent Application 2017-203213, filed on Oct. 20, 2017, the entire contents of which are incorporated herein by reference.

TECHNICAL FIELD

This disclosure generally relates to a cleaning apparatus.

BACKGROUND DISCUSSION

A known cleaning apparatus cleans a cleaning object by first discharging fluid to the cleaning object and then jetting different fluid (second fluid) to the cleaning object. A vehicle at which an onboard camera is mounted, for example, may be equipped with such cleaning apparatus for cleaning a lens of the onboard camera.

JP2014-19403A which is hereinafter referred to as Reference 1 discloses a cleaning apparatus including a cleaning liquid nozzle which jets cleaning liquid to a lens surface of a lens of an onboard optical sensor, for example, and also including an air nozzle which jets air to used cleaning liquid (i.e., residual liquid) which has been jetted out from the cleaning liquid nozzle for cleaning the lens surface. The used cleaning liquid is therefore inhibited from dropping to a predetermined position from the lens surface.

The cleaning liquid is discharged from the cleaning liquid nozzle by means of a liquid pump. The air for cleaning is jetted out from the air nozzle by means of an air pump in a state where the air is mixed with the cleaning liquid or only the air is jetted out from the air nozzle. Accordingly, the used cleaning liquid sprayed on the lens of the onboard camera is inhibited from being adhered to a part of the vehicle body around the lens surface. The vehicle body is thus inhibited from being stained.

A cleaning apparatus disclosed in JP2017-24713A which is hereafter referred to as Reference 2 includes a nozzle jetting cleaning liquid to a lens surface of a lens of an onboard optical sensor, the nozzle also jetting air to remove the used cleaning liquid adhered to the lens surface.

According to the aforementioned cleaning apparatus disclosed in Reference 2, in a case where the cleaning liquid is jetted out, the nozzle is elongated with the pressure of the cleaning liquid. Because the cleaning liquid, for example, is jetted out to a cleaning object from an appropriate direction, cleaning effect may increase. The cleaning liquid is supplied to a chamber in a cylindrical form to move a piston provided within the chamber. A shaft of the piston and the nozzle are connected to each other at an outside of the chamber. That is, the nozzle is configured to extend in conjunction with supply of the cleaning liquid.

A pipe for supplying the cleaning liquid to the nozzle is connected to a position in an inner surface of the chamber with which the piston makes contact during a stroke operation thereof. That is, the supply of the cleaning liquid to the chamber pushes the piston to thereby elongate or extend the nozzle. The piston is further pushed so as to move beyond an opening of the pipe. The cleaning liquid within the chamber is therefore supplied to the nozzle to be jetted out to the cleaning object.

A spring is provided within the chamber for pushing back the piston. In a case where the supply of the cleaning liquid is stopped so that the pressure of the cleaning liquid decreases, the piston is pushed back so as to interrupt communication between the chamber and the pipe.

Another pipe for supplying air is connected to the nozzle. The air is supplied or discharged from the nozzle at the same time the nozzle is elongated to jet the cleaning liquid from the nozzle. Alternatively, the air is supplied from the nozzle in place of stop of jetting of the cleaning liquid. The air is supplied by a different drive source from a drive source for supplying the cleaning liquid. The cleaning liquid adhered to the lens surface is removable by the aforementioned air.

As mentioned above, the nozzle is elongated by supply pressure of the cleaning liquid so that each of the cleaning liquid and the air may be jetted out at predetermined timing.

According to the cleaning apparatus disclosed in Reference 1, in a case of jetting air for cleaning, the air supplied by the air pump flows through an air pipe and thereafter is jetted out from the air nozzle. Thus, in order to increase strength of jetted air (i.e., a force for jetting the air), it is necessary to decrease an inner diameter of the air nozzle or increase a capacity of the air nozzle. At this time, however, the decrease of the inner diameter of the air nozzle leads to decrease of jetting range of the air, which thus requires a large capacity of the air nozzle. As a result, dimensions of the cleaning apparatus increase, which may lead to deterioration of mountability of the cleaning apparatus.

According to the cleaning apparatus disclosed in Reference 2, the pipe which supplies the cleaning liquid from the chamber to the nozzle is once pulled out to the outside from an outer wall of the chamber and is connected to an end portion of the nozzle. Because the chamber and the nozzle move relative to each other, a deformable tube member, for example, is employed for the pipe so that the aforementioned relative movement is absorbed. In such construction, an arrangement space for the pipe is necessary, which increases a mounting space of the cleaning apparatus.

In addition, according to the cleaning apparatus disclosed in Reference 2, a slider is separately provided from the chamber and the nozzle, for example, so as to guide the nozzle and the piston to which the slider are fastened. Thus, the cleaning apparatus may be further enlarged.

As mentioned above, according to the known cleaning apparatus, while the cleaning effect increases because of extension and retraction movement of the nozzle, constructions or arrangements of components are not consistent or unified.

A need thus exists for a cleaning apparatus which is not susceptible to the drawback mentioned above.

SUMMARY

According to an aspect of this disclosure, a cleaning apparatus includes a fluid discharge portion discharging fluid to a cleaning object, a gas discharge portion jetting gas to the cleaning object, a fluid tank storing fluid, a fluid pump supplying the fluid stored at the fluid tank to the fluid discharge portion via a fluid passage, a gas pump supplying gas to the gas discharge portion via a gas passage, a control unit controlling a driving state of each of the fluid pump and the gas pump, a housing at which a part of the fluid passage and a part of the gas passage are provided, and a valve element held at an inside of the housing and being switchable between a closed position at which the gas passage is blocked and an open position at which the gas passage is opened, the valve element including a first surface which faces the fluid passage to receive a fluid pressure from the fluid passage in a direction where the valve element is brought to the closed position and including a second surface which faces the gas passage to receive a gas pressure from the gas passage in a direction where the valve element is brought to the open position in a state where the valve element is disposed at the closed position.

According to another aspect of this disclosure, the cleaning apparatus includes a casing, a first port receiving a first fluid, a second port receiving a second fluid, a first fluid chamber provided at the casing and including a tubular form, a piston configured to slide along an inner surface of the first fluid chamber in a state being pressed by the first fluid which flows into the first fluid chamber from the first port, a first nozzle integrally provided with the piston and including a first flow passage through which the first fluid flows and a discharge portion discharging the first fluid to a cleaning object, the first nozzle being configured to extend and retract relative to the casing, a second fluid chamber provided at the casing, a second nozzle including a second flow passage through which the second fluid that is received from the second fluid chamber flows and a discharge portion discharging the second fluid to the cleaning object, the second nozzle being configured to extend and retract relative to the casing and extending together with the first nozzle when the first nozzle extends from the casing, and a biasing portion biasing at least one of the first nozzle and the second nozzle in a direction where at least the one of the first nozzle and the second nozzle is retracted into the casing, the piston within which the first flow passage is provided, the first flow passage extending from the first fluid chamber to the first nozzle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A cleaning apparatus S according to a first embodiment is explained with reference to FIGS. 1 to 3. The cleaning apparatus S cleans a camera C1 serving as a cleaning object C mounted at a vehicle body B of an automobile (vehicle), for example, or various sensors by jetting a cleaning water W serving as a first fluid L1 and a cleaning air A serving as a second fluid L2.

Figure 1:
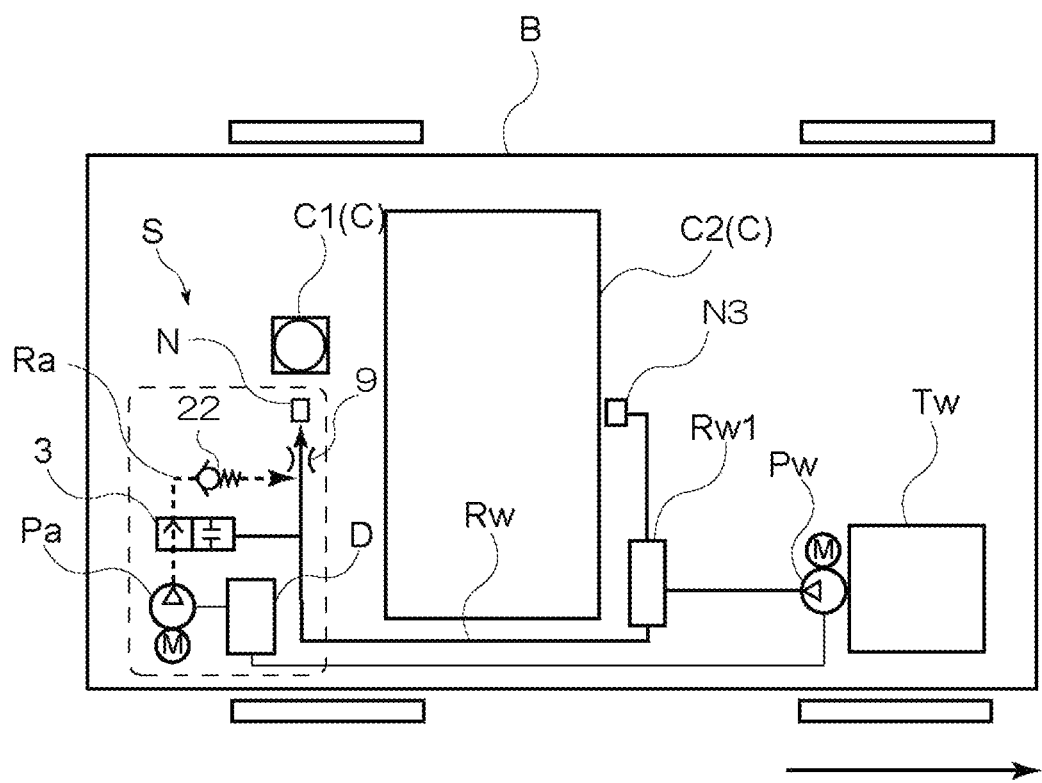
FIG. 1 is an explanatory view illustrating a construction of a cleaning apparatus according to a first embodiment disclosed here.

The cleaning apparatus S cleans a lens of the camera C1 mounted at a rear portion of the vehicle body B as illustrated in FIG. 1. The cleaning apparatus S includes a single cleaning nozzle N which is constituted by a fluid discharge portion discharging the cleaning water W and a gas discharge portion jetting the cleaning air A.

A cleaning water supply passage supplying the cleaning water W, serving as an example of a fluid passage (which is hereinafter referred to as a water passage Rw) and a cleaning air supply passage supplying the cleaning air A, serving as an example of a gas passage (which is hereinafter referred to as an air passage Ra) are gathered and connected to each other at an upstream side of the cleaning nozzle N.

The water passage Rw connects between a water tank Tw serving as a fluid tank arranged at a predetermined position in the vehicle body B and the cleaning nozzle N. A water pump Pw serving as a fluid pump is arranged at a downstream side of the water tank Tw. The water pump Pw is driven by a control unit D which is explained later.

The cleaning water W is used not only for cleaning the camera C1 in the rear but also for cleaning a rear window C2, for example. Thus, a water passage switching portion Rw1 for switching a supply destination of the cleaning water W is provided at a portion in the water passage Rw. A rear window nozzle N3 discharging the cleaning water W to the rear window C2 is provided at a downstream side of the water passage switching portion Rw1.

An orifice 9 is provided at the water passage Rw to be positioned at an upstream side of the cleaning nozzle N. The orifice 9 reduces areas of the respective flow passages of the cleaning water W and the cleaning air A to increase respective jetting speeds of the cleaning water W and the cleaning air A.

The cleaning air A is pressurized at an air pump Pa serving as a gas pump and is supplied to the cleaning nozzle N via the air passage Ra. A check valve 22 is provided at the air passage Ra to be positioned at an upstream side of a joint portion where the air passage Ra and the water passage Rw are joined to each other. With a construction that the air passage Ra and the water passage Rw are joined to each other as in the present construction, it may be inevitable that some of the cleaning water W which remains at the cleaning nozzle N is discharged at the time of jetting of the cleaning air A. In a case where a volume of such cleaning water W increases, effect of removing the cleaning water W (i.e., removal effect) by the cleaning air A decreases. Therefore, because of the check valve 22, the cleaning water W is inhibited from entering the air passage Ra to thereby reduce the volume of the cleaning water W which is discharged upon jetting of the cleaning air A.

Figure 2A:
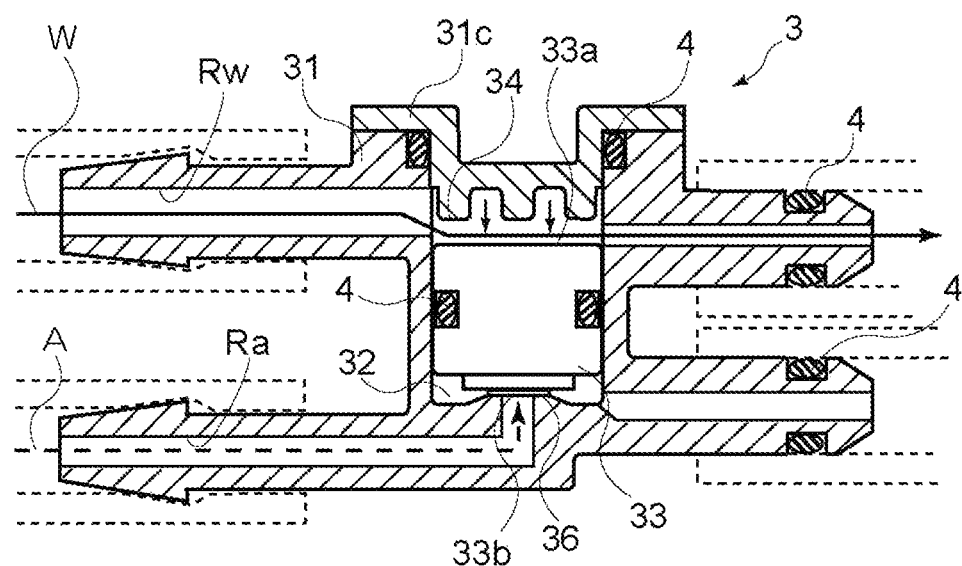
FIGS. 2A and 2B are explanatory views each of which illustrates a construction of a switching valve according to the first embodiment.
Figure 2B:
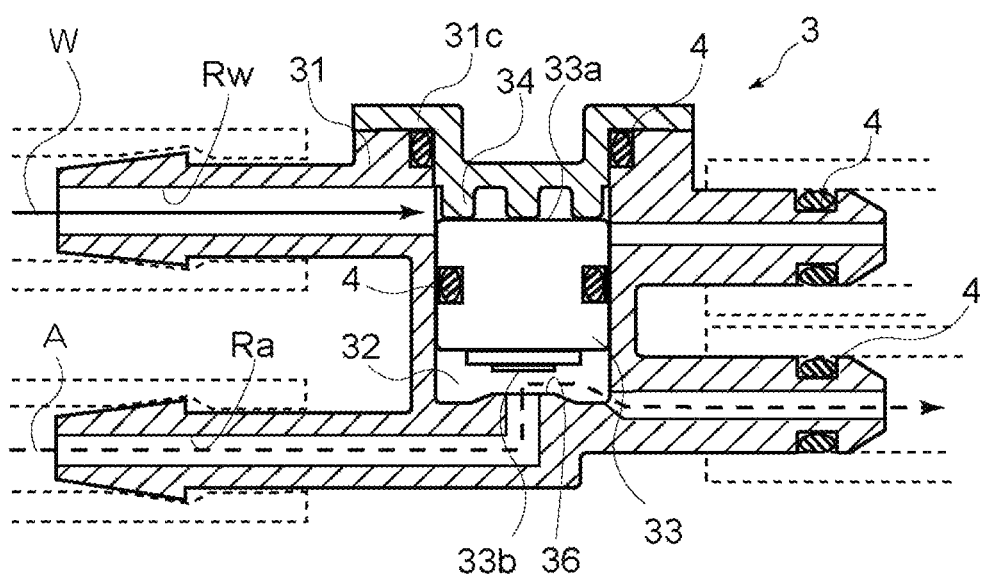

The discharge of the cleaning water W and the jetting of the cleaning air A are performed by a switching valve 3. The switching valve 3 includes a single housing 31 within which a part of the water passage Rw and a part of the air passage Ra are arranged side by side or adjacent to each other as illustrated in FIGS. 2A and 2B. A valve element housing portion 32 in a cylindrical form is provided at a position in the switching valve 3 where the water passage Rw and the air passage Ra are connected to each other. A valve element 33 in a piston form is housed at the inside of the valve element housing portion 32 to be movable in a reciprocating manner. An annular-formed seal member 4 which seals a clearance between the valve element 33 and the valve element housing portion 32 is provided at an outer periphery of the valve element 33. The seal member 4 is also provided at a tip end portion of each of the water passage Rw and the air passage Ra. Thus, tight sealing is secured between the valve element housing portion 32 and each of the water passage Rw and the air passage Ra serving as a pipe.

As illustrated in FIG. 2A, the valve element 33 makes contact with a valve seat 36 provided at the housing 31 in a case where the valve element 33 moves to the air passage Ra to thereby block or close the air passage Ra and open the water passage Rw. On the other hand, as illustrated in FIG. 2B, the water passage Rw is blocked or closed and the air passage Ra is opened in a case where the valve element 33 moves to the water passage Rw. The switching valve 3 changes the position of the valve element 33 by a water pressure of the cleaning water W to thereby switch the air passage Ra between a blocked state and a communication state. The position of the valve element 33 at which the air passage Ra is in the communication state is hereinafter referred to as an open position and the position of the valve element 33 at which the air passage Ra is in the blocked state is hereinafter referred to as a closed position.

The valve element 33 includes a first surface 33a and a second surface 33b at opposed end portions along a direction where the valve element 33 moves in a reciprocating manner. The first surface 33a faces the water passage Rw to receive a water pressure (fluid pressure) from the water passage Rw in a direction to close the valve element 33 (i.e., the closed position of the valve element 33). The second surface 33b faces the air passage Ra to receive an air pressure (gas pressure) from the air passage Ra in a direction to open the valve element 33 (i.e., the open position of the valve element 33). The first surface 33a and the second surface 33b are specified to have dimensions so that the water pressure applied to the first surface 33a is greater than the air pressure applied to the second surface 33b in a case where the water pump Pw and the air pump Pa are driven at the same time.

For example, in a state where a maximum discharge pressure of the air pump Pa is defined as PA, an area of the second surface 33b is defined as VA, a pressure of the water pump Pw when the cleaning water W is discharged is defined as PW, and an area of the first surface 33a is defined as VW, the first surface 33a and the second surface 33b are specified so that a relationship of PA·VA<PW·VW is obtained.

As illustrated in FIGS. 2A and 2B, a cover member 31c is provided at a position in the valve element housing portion 32 to face the first surface 33a of the valve element 33. The cover member 31c includes a protruding portion 34 which is configured to make contact with the first surface 33a of the valve element 33. The seal member 4 in an annular form for sealing a clearance between the cover member 31c and the housing 31 is provided at an outer periphery of the cover member 31c. The protruding portion 34 makes contact with the first surface 33a in a state where the valve element 33 is at the open position. A state where the cleaning water W at the water passage Rw constantly or continuously makes contact with the first surface 33a is maintained so that the valve element 33 immediately moves to the closed position when the driving of the water pump Pw is started.

As mentioned above, the water passage Rw and the air passage Ra are arranged side by side within the housing 31 in a state where the valve element 33 which moves in a reciprocating manner is disposed at a substantially middle position between the water passage Rw and the air passage Ra so that the water pressure and the air pressure are separately applied to the first surface 33a and the second surface 33b respectively, the first surface 33a and the second surface 33b being provided at the opposed ends of the valve element 33. Thus, the water passage Rw, the air passage Ra and the valve element 33 may be effectively arranged at the inside of the single housing 31, which leads to a smooth reciprocating movement of the valve element 33. In addition, because the water pressure and the air pressure are separately applied to the first surface 33a and the second surface 33b respectively, the first surface 33a and the second surface 33b being opposed to each other at the valve element 33, a simple valve construction without a particular biasing member is obtainable.

Figure 3:
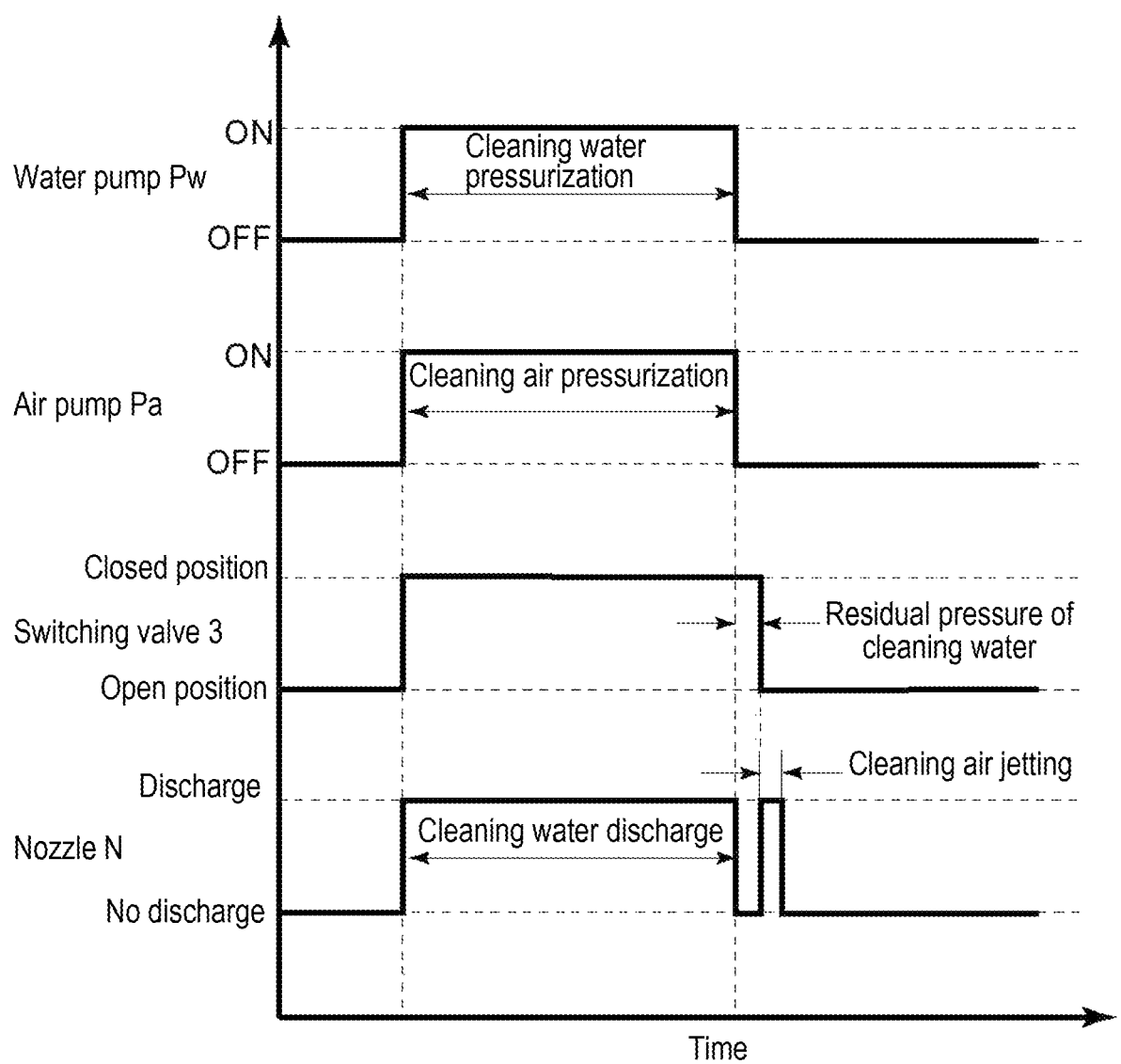
FIG. 3 is an explanatory view illustrating an operation of the cleaning apparatus according to the first embodiment.

The control unit D controls the water pump Pw and the air pump Pa based on a time chart as illustrated in FIG. 3, for example.

The water pump Pw is driven when a driver of the vehicle body B (vehicle) determines via a monitor that the camera C1 is stained and operates a drive switch or algorism for stain detection determines that cleaning of the camera C1 or a sensor is necessary.

In a case where the water pump Pw is driven, the water pressure of the cleaning water W between the water pump Pw and the orifice 9 increases and the cleaning water W after passing through the orifice 9 is discharged from the cleaning nozzle N. A particular shielding valve is not provided at a portion in the water passage Rw so that the cleaning water W is immediately discharged at the time of driving of the water pump Pw. At this time, the valve element 33 of the switching valve 3 is fixed at the closed position at which the air passage Ra is blocked because of the first surface 33a being pressed by application of the water pressure as illustrated in FIG. 2A.

The air pump Pa is started to be driven simultaneously with driving of the water pump Pw in an example illustrated in FIG. 3. In order to increase strength and volume of the cleaning air A jetted out from the cleaning nozzle N, the air pump Pa is necessarily driven prior to jetting of the cleaning air A so as to increase the pressure of the cleaning air A. Timing at which the air pump Pa is driven (i.e., driving start timing) may be appropriately decided on a basis of removal effect of the cleaning water W which remains at the surface of the cleaning object C and specified on a basis of capability of the air pump P. Therefore, the driving start timing of the air pump Pa may be specified at least before the stop of driving of the water pump Pw so as to increase the pressure of the cleaning air A beforehand.

It is easy to control driving of both the water pump Pw and the air pump Pa in a case where the air pump Pa is started to be driven simultaneously with the driving start timing of the water pump Pw. In such case, because the cleaning air A is inhibited from being jetted out by the switching valve 3 until the driving of the water pump Pw is finished, the pressure of the cleaning air A increases over a maximum (i.e. longest) time period. Accordingly, the driving start timing of the water pump Pw and the driving start timing of the air pump Pa match each other to obtain the cleaning apparatus S which is easily controlled while the removal effect of the cleaning water W by the cleaning air A is secured.

In a case where the water pump Pw is stopped, the water pressure of the cleaning water W decreases. Because the cleaning water W receives flow resistance at the orifice 9, the discharge of the cleaning water W stops substantially simultaneously with the stop of the water pump Pw. The water pressure at the water passage Rw starts decreasing with the stop of the water pump Pw. After the pressure at the air passage Ra exceeds the water pressure at the water passage Rw, the valve element 33 moves towards the open position. Accordingly, as illustrated in FIG. 2B, the second surface 33b of the valve element 33 is pressed by the air pressure so that the valve element 33 is held at the open position at which the air passage Ra is open. As illustrated in FIG. 3, the jetting of the cleaning air A starts a little late from the stop of the water pump Pw. The cleaning air A is jetted out after a short time period from the end of discharge of the cleaning water W.

Timing at which the air pump Pa is stopped (i.e., stop timing of the air pump Pa) may be the same as timing at which the water pump Pw is stopped (i.e., stop timing of the water pump Pw) or may be delayed from the stop timing of the water pump Pw. In a case where the stop timing of the air pump Pa is delayed from the stop timing of the water pump Pw, jetting pressure of the cleaning air A may securely increase. In a case where the water pump Pw and the air pump Pa are stopped at the same time, for example, the valve element 33 moves to the open position by the stop of the water pump Pw so that the cleaning air A which is compressed is jetted out from the cleaning nozzle N. At this time, however, a part of cleaning air A flows backwards to the air pump Pa because of the stop of the air pump Pa to thereby slightly decrease the pressure at the air passage Ra. Thus, strength of the cleaning air A jetted out from the cleaning nozzle N is deteriorated. Accordingly, the stop timing of the air pump Pa is delayed from the stop timing of the water pump Pw to highly maintain and secure the jetting pressure of the cleaning air A.

In a case where on and off operations of each of the water pump Pw and the air pump Pa conform to on and off operations of the cleaning apparatus S performed by the driver of the vehicle body B, for example, the construction of the control unit D may be further simplified.

Because of the switching valve 3 including the aforementioned construction, the position of the valve element 33 may be changed by the water pressure of the cleaning water W and the pressure of the cleaning air A in a case where the cleaning water W is discharged to the cleaning object C or the cleaning air A is jetted out to the cleaning object C. Thus, an electromagnetic valve for switching the position of the valve element 33, for example, is not necessary, which may obtain the cleaning apparatus S with simple construction and small entire dimensions.

Figure 4:
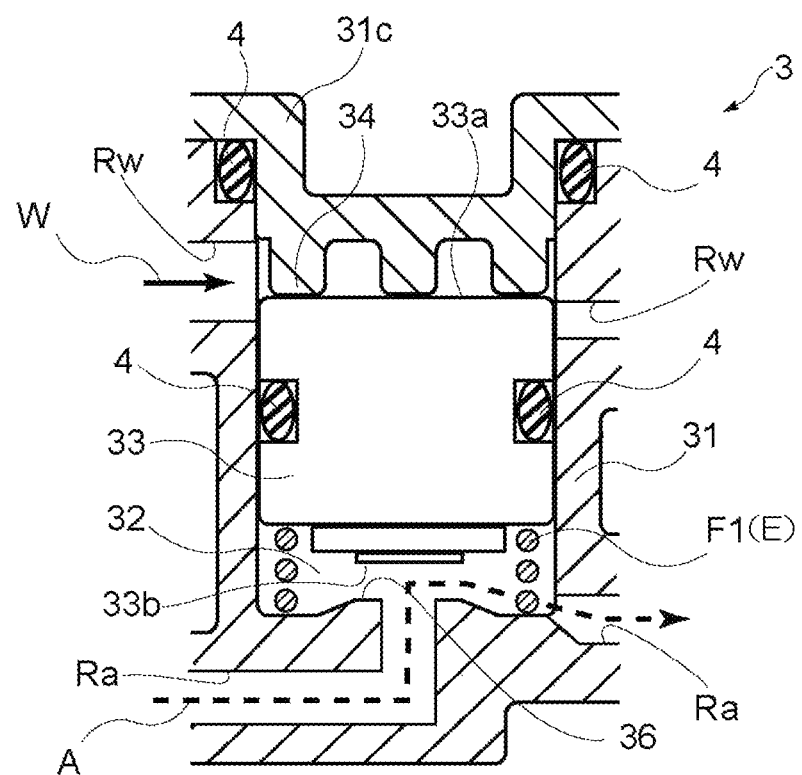
FIG. 4 is an explanatory view illustrating the construction of the switching valve according to a second embodiment disclosed here.

According to a second embodiment of the cleaning apparatus S, a biasing portion E which biases the valve element 33 in a direction to the open position may be provided at the valve element 33 of the switching valve 3 as illustrated in FIG. 4. The biasing portion E may be constituted by a coil spring F1, for example.

In addition to the air pressure of the cleaning air A, a biasing force of the coil spring F1 is applied to the second surface 33b of the valve element 33. Thus, in a case where the driving of the water pump Pw is stopped so that the water pressure applied to the first surface 33a decreases, the valve element 33 is immediately movable to the open position. As a result, a time period from the end of discharge of the cleaning water W to the jetting of the cleaning air A is reduced. The cleaning air A may disperse or blow off the cleaning water W before the cleaning water W which is discharged to the camera C1, for example, drops. The cleaning water W is therefore inhibited from remaining at the cleaning object C such as the camera C1, for example, to thereby securely perform a cleaning operation.

Figure 5:
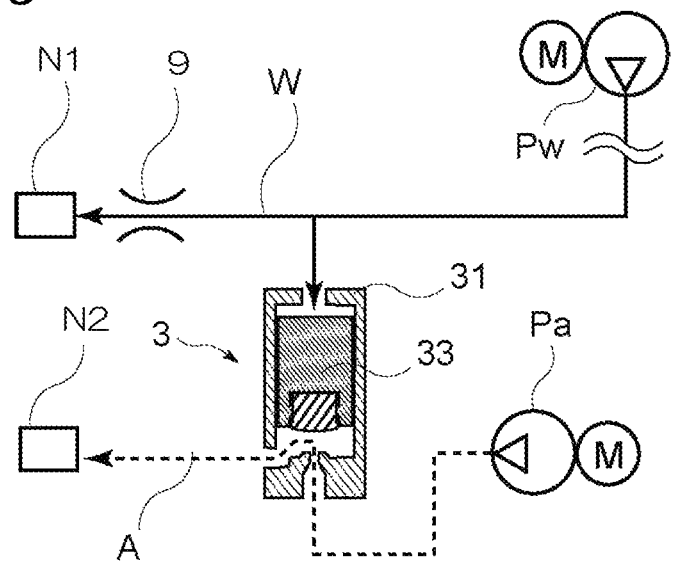
FIG. 5 is an explanatory view illustrating the construction of the cleaning apparatus according to a third embodiment disclosed here.

According to a third embodiment of the cleaning apparatus S, a first nozzle N1 serving as the fluid discharge portion discharging the cleaning water W and a second nozzle N2 serving as the gas discharge portion jetting the cleaning air A may be separately provided from each other as illustrated in FIG. 5.

In a case where the common nozzle is provided for the cleaning water W and the cleaning air A as illustrated in FIG. 1 according to the first embodiment, a part of the cleaning air A may be supplied to the water passage Rw when the air is jetted out from the common nozzle, which may lead to a less jetting volume of air from the common nozzle. In addition, because of the cleaning water W flowing into the air passage Ra, the cleaning water W may freeze within the air passage Ra or the air passage Ra may be corroded. Further, the check valve 22 is necessarily mounted so as to inhibit the cleaning water W from entering the air passage Ra.

As illustrated in FIG. 5, because the first nozzle N1 and the second nozzle N2 are separately provided from each other, one of the cleaning water W and the cleaning air A is inhibited from being mixed with the other of the cleaning water W and the cleaning air A. A predetermined volume of each of the cleaning water W and the cleaning air A is securely discharged or jetted out to the cleaning object C, which may increase cleaning effect.

Figure 6:
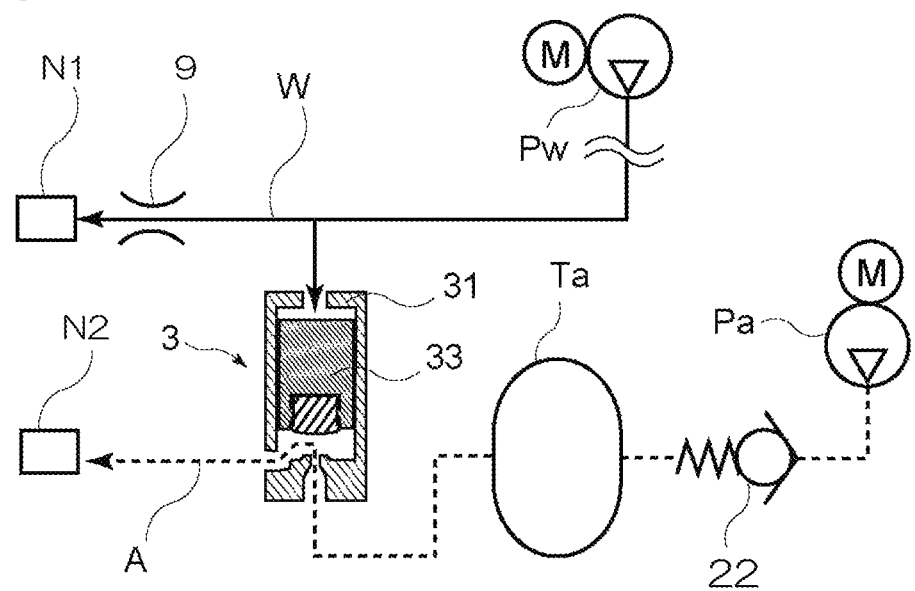
FIG. 6 is an explanatory view illustrating the construction of the cleaning apparatus according to a fourth embodiment disclosed here.

According to a fourth embodiment of the cleaning apparatus S, in order to increase jetting effect of the cleaning air A, a gas tank which compresses and stores the cleaning air A, i.e., an air tank Ta, may be provided at a portion in the air passage Ra so as to be positioned at an upstream side of the switching valve 3 as illustrated in FIG. 6. The capacity of the air tank Ta may be specified conforming to the volume of the cleaning air A which should be jetted out. Because of the air tank Ta, a large volume of cleaning air A that is highly pressurized may be stored, which may increase the removal effect of the cleaning water W which is previously discharged.

Once the capacity of the air tank Ta is specified, the capacity of the air pump Pa is determined. That is, because the pressure at the air tank Ta is necessarily increased to a predetermined pressure level while the cleaning water W is being discharged, supply capacity of the air pump Pa needs to increase with increase of capacity of the air tank Ta.

In a construction where the check valve 22 is provided at an upstream side of the air tank Ta so that the cleaning air A stored at the air tank Ta is inhibited from flowing backwards to the air pump Pa, the compressed cleaning air A may be securely jetted out to the cleaning object C.

Figure 7:
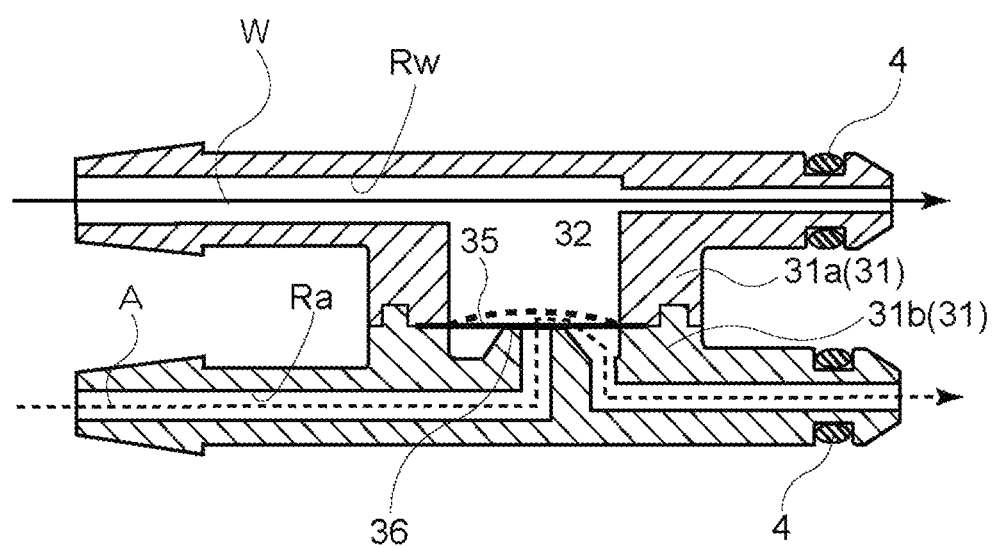
FIG. 7 is an explanatory view illustrating the construction of the switching valve according to a fifth embodiment disclosed here.

According to a fifth embodiment of the cleaning apparatus S, a diaphragm 35 may be employed in place of the valve element 33 of the switching valve 3 as illustrated in FIG. 7. The diaphragm 35 in a film form which separates the water passage Rw and the air passage Ra from each other is provided at the inside of the housing 31. The diaphragm 35 is constituted by an elastic member such as a rubber, for example, to selectively open and close the air passage Ra depending on a relative change between the water pressure of the cleaning water W and the air pressure of the cleaning air A.

As illustrated in FIG. 7, the diaphragm 35 is provided at the valve element housing portion 32 which is disposed at a boundary position between the water passage Rw and the air passage Ra within the housing 31. The housing 31 is constructed to be divided into a first housing 31a and a second housing 31b, for example, so as to secure and fix the diaphragm 35. In a case where the first housing 31a and the second housing 31b are combined to each other, a peripheral edge portion of the diaphragm 35 is sandwiched between the first housing 31a and the second housing 31b.

The air passage Ra which extends from the air pump Pa is opened at a wall portion of the valve element housing portion 32. A portion around the aforementioned opening of the air passage Ra functions as the valve seat 36 with which the diaphragm 35 makes contact. In a case where the diaphragm 35 is in a free state, the diaphragm 35 makes contact with the valve seat 36. The air passage Ra leading to the cleaning nozzle N is in communication with a part of the wall portion of the valve element housing portion 32 positioned at an outer side of the valve seat 36. In a case where the water pressure of the cleaning water W is relatively high, the diaphragm 35 is pressed against the valve seat 36 to thereby block or close the air passage Ra. On the other hand, in a case where the air pressure of the cleaning air A becomes relatively high because the water pump Pw is stopped, for example, the diaphragm 35 is pushed to separate from the valve seat 36. As a result, the air passage Ra is opened so that the cleaning air A is jetted out to the cleaning object C.

Accordingly, the diaphragm 35 is deformed depending on a pressure difference between the water pressure of the cleaning water W and the air pressure of the cleaning air A applied to respective opposed surfaces of the diaphragm 35. Such deformation of the diaphragm 35 may correspond to at least a small opening of the diaphragm 35 from its closed position, which may result in a small volume of the valve element housing portion 32. Because of the diaphragm 35, the cleaning apparatus S with small external dimensions and improved mountability is obtainable.

Figure 8:
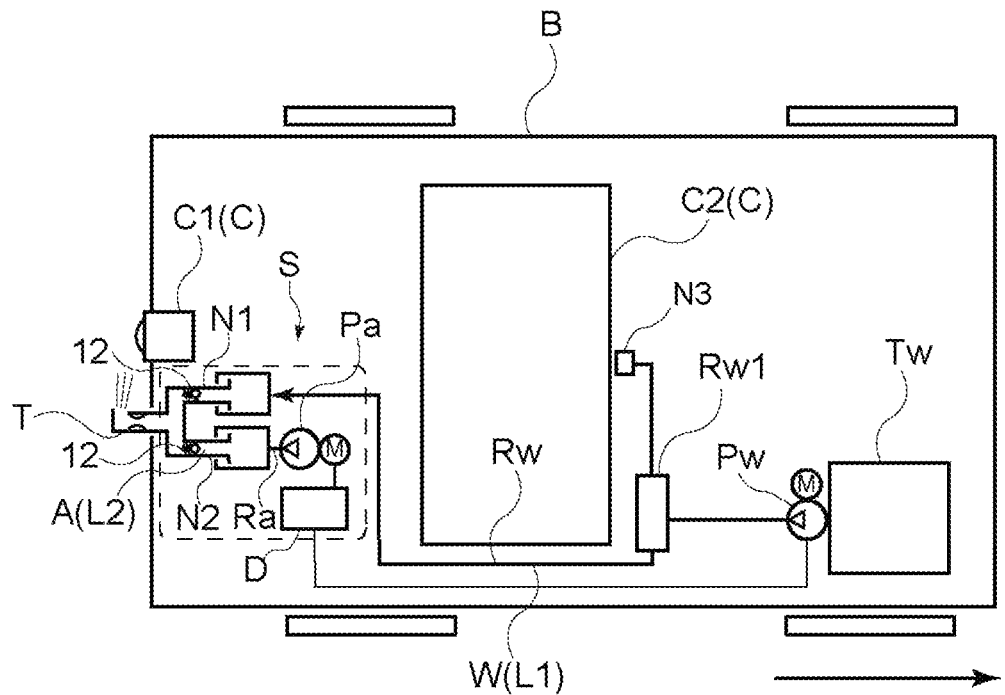
FIG. 8 is an explanatory view illustrating the construction of the cleaning apparatus according to a sixth embodiment disclosed here.

A sixth embodiment of the cleaning apparatus S is explained with reference to FIGS. 8 to 10. As illustrated in FIG. 8, the cleaning apparatus S cleans the camera C1 serving as the cleaning object C mounted at the vehicle body B of an automobile (vehicle), for example, or various sensors by jetting the cleaning water W serving as the first fluid L1 and the cleaning air A serving as the second fluid L2. As the cleaning object C, not only a camera or a sensor at a rear of the vehicle but also a camera or a sensor at a front or left and right (i.e., left and right sensors for side mirrors, for example) of the vehicle is applicable.

The cleaning apparatus S according to the sixth embodiment cleans a lens of the camera C1 mounted at a rear portion of the vehicle body B. The cleaning apparatus S includes the first nozzle N1 where a first discharge portion T1 is provided, the first discharge portion T1 through which the cleaning water W is discharged, and the second nozzle N2 where a second discharge portion T2 is provided, the second discharge portion T2 through which the cleaning air A is jetted out. The first discharge portion T1 and the second discharge portion T2 may be a common discharge portion T as illustrated in FIG. 8.

The water tank Tw of the cleaning water W is arranged at a predetermined position in the vehicle body B. The cleaning water W is supplied from the water tank Tw to the first nozzle N1 of the cleaning apparatus S via the water passage Rw. The water pump Pw is arranged at a downstream of the water tank Tw. The water pump Pw is driven by the control unit D which is explained later.

The cleaning water W is used not only for cleaning the camera C1 in the rear but also for cleaning the rear window C2, for example. Thus, the water passage switching portion Rw1 is provided at a portion in the water passage Rw. The rear window nozzle N3 discharging the cleaning water W to the rear window C2 is provided at a downstream side of the water passage switching portion Rw1.

The cleaning air A is pressurized at the air pump Pa to be supplied to the second nozzle N2 via the air passage Ra. The air pump Pa is also driven by the control unit D.

Figure 9:
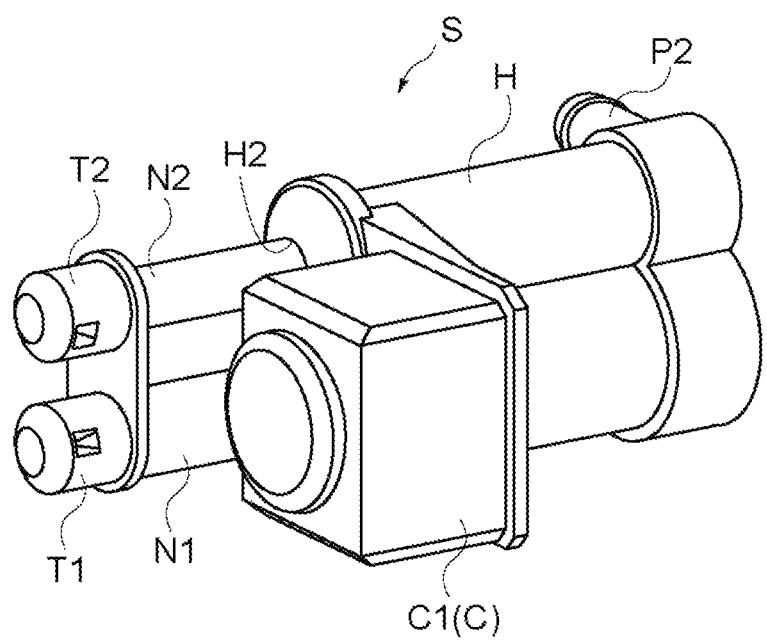
FIG. 9 is a perspective view illustrating an external appearance of the cleaning apparatus according to the sixth embodiment.

FIG. 9 illustrates an external appearance of the cleaning apparatus S. The cleaning apparatus S is constructed to be easily mounted at the vehicle body B in a state where a casing H and the camera C1 are integrally formed. A first port P1 into which the cleaning water W flows, i.e., receiving the cleaning water W, and a second port P2 into which the cleaning air A flows, i.e., receiving the cleaning air A, are provided at a first end portion of the casing H. A first insertion bore H1 through which the first nozzle N1 is extendable and retractable relative to the casing H (i.e., the first nozzle N1 performs an extension and retraction operation) and a second insertion bore H2 through which the second nozzle N2 is extendable and retractable relative to the casing H (i.e., the second nozzle N2 performs an extension and retraction operation) are provided at a second end portion of the casing H. In FIG. 9, the first nozzle N1 and the second nozzle N2 which are integrally formed are elongated (i.e., in an elongated state). The first nozzle N1 and the second nozzle N2 in the elongated state discharge the cleaning water W or the cleaning air A to the camera C1.

Figure 10A:
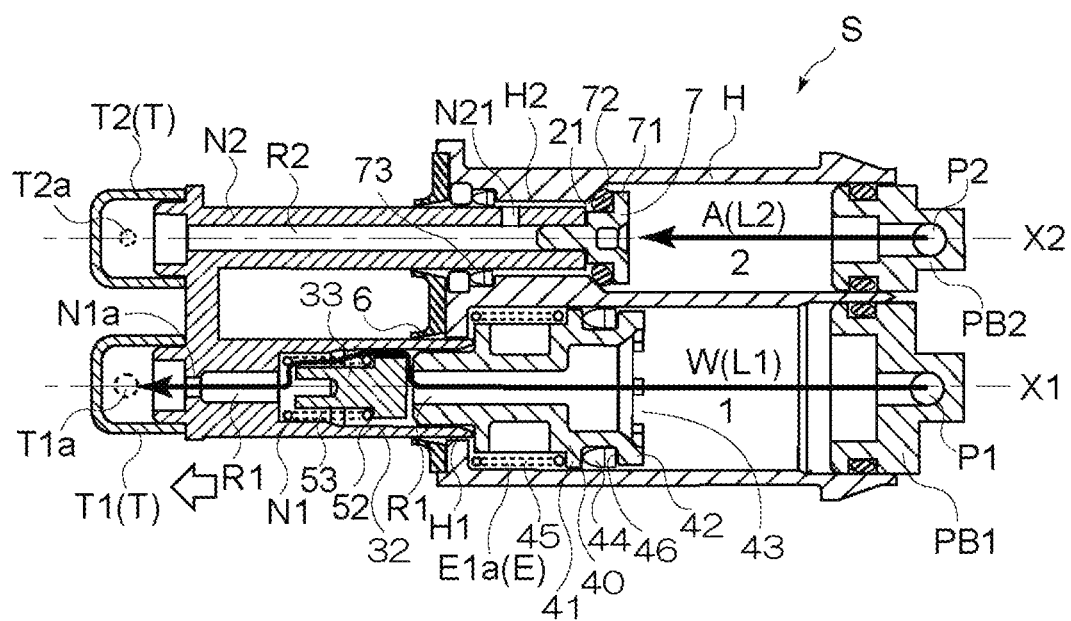
FIGS. 10A and 10B are cross-sectional views each of which illustrates the construction of the cleaning apparatus according to the sixth embodiment.
Figure 10B:
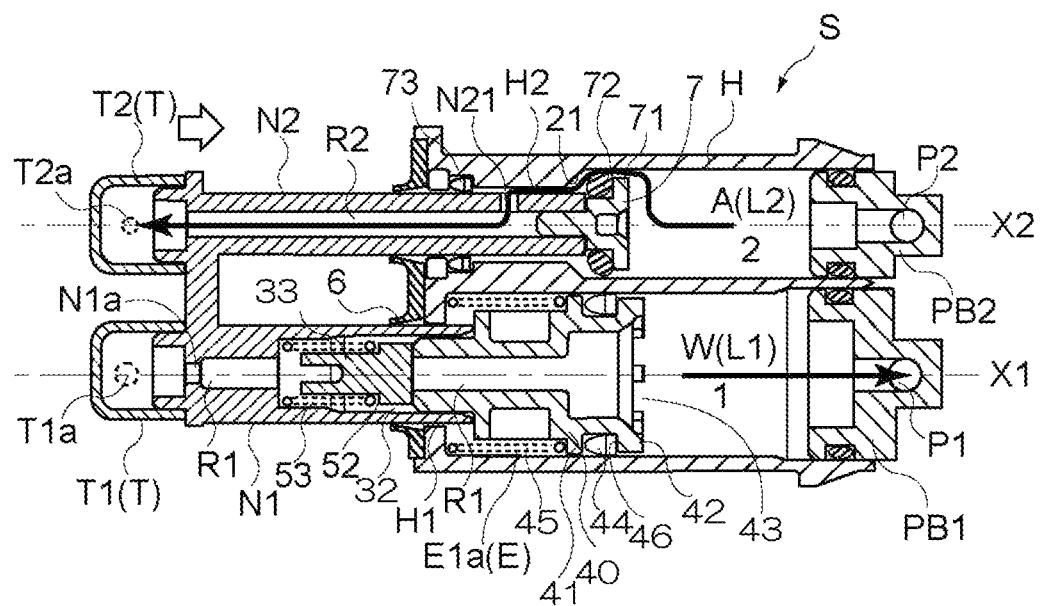

FIGS. 10A and 10B each illustrate an internal construction of the cleaning apparatus S. FIG. 10A illustrates the first nozzle N1 and the second nozzle N2 in the elongated state. FIG. 10B illustrates the first nozzle N1 and the second nozzle N2 in a middle of retracting state.

As illustrated in FIGS. 10A and 10B, the casing H includes a first fluid chamber 1 communicating with the first port P1 and a second fluid chamber 2 communicating with the second port P2. Each of the first fluid chamber 1 and the second fluid chamber 2 is constructed in a cylindrical form. The first port P1 and the second port P2 are formed at a first port member PB1 and a second port member PB2 respectively, the first port member PB1 and the second port member PB2 being internally fitted and fixed to the casing H.

A piston 40 driven by the cleaning water W that is taken from the first port P1 is disposed at the first fluid chamber 1. The first nozzle N1 is connected to the piston 40. An end portion of the second nozzle N2 which is integrally formed with the first nozzle N1 is inserted to be positioned within the second fluid chamber 2. The second nozzle N2 moves in a reciprocating manner relative to the second fluid chamber 2 in conjunction with the operation of the first nozzle N1.

The first nozzle N1 is fitted and connected to one end portion (i.e., a tip end portion) of the piston 40. The piston 40 is pressed by the cleaning water W which flows into the first fluid chamber 1 from the first port P1 so that the first nozzle N1 is brought to the elongated state where the first nozzle N1 protrudes from the casing H. A first spring holder portion 41 in a flange form is provided at an outer periphery of the piston 40 so as to define a first spring chamber 45 between the outer periphery of the piston 40 and an inner surface of the casing H. A first spring E1a serving as the biasing portion E is provided at the inside of the first spring chamber 45 so as to be positioned between an end surface of the casing H and the first spring holder portion 41. The first spring E1a constantly biases the piston 40 in a direction where the first nozzle N1 is retraced in the casing H.

The first spring E1a may be provided at the second nozzle N2 as long as the first nozzle N1 and the second nozzle N2 are integrally formed with each other.

The piston 40 includes a base end portion 42 in a tubular form closer to the first port P1. The base end portion 42 is one of opposed end portions of the piston 40. The cleaning water W enters the inside of the aforementioned tubular-formed base end portion 42 to thereby easily push out the piston 40. The base end portion 42 makes contact with the first port member PB1 in a case where the piston 40 is innermost retracted into the first fluid chamber 1. A slit 43 is intermittently formed at the base end portion 42 along a circumferential direction thereof. Because the cleaning water W enters the inside of the slit 43, an area of the piston 40 pressed by the cleaning water W in a direction where the first nozzle N1 protrudes is secured to thereby increase initial characteristics of the piston 40.

An annular groove portion 46 is formed at an outer peripheral surface of the piston 40. A piston seal 44 is provided at the annular groove portion 46. The piston seal 44 makes slidable contact with an inner surface of the first fluid chamber 1 to inhibit the cleaning water W at the first fluid chamber 1 from flowing into the first spring chamber 45. The piston seal 44 also functions to stabilize the position or posture of the piston 40 in a case where the piston 40 slides relative to the inner surface of the first fluid chamber 1.

The first spring chamber 45 is filled with air which may communicate with and flow to the outside at the time of reciprocation of the piston 40. A small cutout may be formed at a dust seal 6 which is in contact with an outer surface of the first nozzle N1 so that a clearance is defined between the dust seal 6 and the first nozzle N1. As a result, reciprocating motion of the piston 40 by the cleaning water W is not interrupted.

The dust seal 6 inhibits a foreign substance from entering the first spring chamber 45 from the outside and maintains smooth reciprocating motion of the first nozzle N1. The dust seal 6 is constituted by any kind of rubber member or resin member, for example, so as to maintain the state making contact with an outer peripheral surface of the first nozzle N1.

The first nozzle N1 includes therein the valve element housing portion 32 accommodating the valve element 33 which selectively makes contact with or separates from an end portion of the piston 40. A valve element spring holder 52 in a stepped form is provided at the outer periphery of the valve element 33. A valve element spring 53 is disposed between an end surface of the valve element housing portion 32 and the valve element spring holder 52. The valve element spring 53 biases the valve element 33 to make contact with the end portion of the piston 40.

A first flow passage R1 is formed at the piston 40 and the first nozzle N1 for circulating and flowing the cleaning water W along an axis X1 of the piston 40. The valve element 33, which is a solid member, is formed in dimensions so that a clearance is defined between an outer peripheral surface of the valve element 33 and an inner peripheral surface of the valve element housing portion 32. An end portion of the valve element 33 makes contact with the end portion of the piston 40 to thereby close or block the first flow passage R1 of the piston 40. At this time, however, when the supply pressure of the cleaning water W increases to overcome a biasing force of the valve element spring 53, the valve element 33 separates from the piston 40 to cause the cleaning water W to flow to the first nozzle N1 (specifically, to the first flow passage R1 of the first nozzle N1).

With the first nozzle N1 constructed in the aforementioned manner, when the cleaning water W is supplied from the first port P1, the piston 40 and the first nozzle N1 protrude from the casing H in a state where the valve element 33 makes contact with (i.e., blocks) a tip end portion of the piston 40. In order to obtain the aforementioned operation, the biasing force of the first spring E1a is specified smaller than the biasing force of the valve element spring 53. As illustrated in FIG. 10A, when the piston 40 moves to an end portion of the first fluid chamber 1, an inner pressure of the first fluid chamber 1 further increases. In a case where a force pressing the valve element 33 exceeds the biasing force of the valve element spring 53, the cleaning water W is discharged from the first nozzle N1.

An orifice N1a is provided at a tip end of the first nozzle N1 in a state where an inner diameter of the orifice N1a is reduced for increasing strength of discharge of the cleaning water W. The first discharge portion T1 in a cap form is provided at the tip end of the first nozzle N1. A first discharge port T1a is provided at the first discharge portion T1 so that the cleaning water W is discharged to the lens of the camera C1 through the first discharge port T1a in a state where the first nozzle N1 is most elongated.

As mentioned above, in the cleaning apparatus S of the sixth embodiment, the first flow passage R1 extending from the first fluid chamber 1 to the first nozzle N1 is formed at the inside of the piston 40. Thus, a mechanism where the pressure of the cleaning water W is utilized for extending or elongating the first nozzle N1 and the second nozzle N2 is simply constructed. Specifically, the arrangement of the first flow passage R1 may be simplified, which leads to a wide range of application of the cleaning apparatus S in view of mountability thereof.

The second nozzle N2 discharges the cleaning air A to remove the cleaning water W which has been discharged by the first nozzle N1. As illustrated in FIGS. 10A and 10B, a tip end portion of the second nozzle N2 is integrally formed with a tip end portion of the first nozzle N1. Thus, the second nozzle N2 performs the same extension and retraction operation as the first nozzle N1. At this time, however, the cleaning air A is discharged from the second nozzle N2 at different timing from timing at which the cleaning water W is discharged from the first nozzle N1 based on the following construction.

The second nozzle N2 includes a tubular form and a second flow passage R2 at a center portion, the second flow passage R2 being formed along a longitudinal direction of the second nozzle N2. The end portion of the second nozzle N2 at a base end side is inserted to be positioned within the second insertion bore H2 formed at the casing H so that the end portion of the second nozzle N2 reaches the second fluid chamber 2. A sealing member 7 is inserted and fixed to the end portion of the second nozzle N2. The sealing member 7 includes a blocking portion 71 in a flange form including an outer diameter greater than an outer diameter of a tubular portion of the second nozzle N2. The blocking portion 71 is arranged between the casing H and the second nozzle N2, i.e., arranged over the casing H and the second nozzle N2.

The outer diameter of the sealing member 7 is slightly smaller than an inner diameter of the second fluid chamber 2. The outer diameter of the second nozzle N2 is slightly smaller than an inner diameter of the second insertion bore H2. A bore portion N21 is provided in the vicinity of the end portion of the second nozzle N2 facing the sealing member 7 for communication between the second flow passage R2 at the inside the second nozzle N2 and the outside.

An air seal 72 in an annular form is provided at the blocking portion 71. A stepped portion 21 is formed at an inner surface of the second fluid chamber 2. That is, as illustrated in FIG. 10A, in a state where the second nozzle N2 is positioned within a predetermined range from an end point at an extension side (i.e., the most extending position) of the second nozzle N2, the air seal 72 tightly makes contact with the blocking portion 71 and the stepped portion 21 to thereby interrupt the cleaning air A at the second fluid chamber 2 from flowing to the second flow passage R2. On the other hand, the cleaning air A at the second fluid chamber 2 is allowed to flow to the second flow passage R2 of the second nozzle N2 in a state where the blocking portion 71 of the sealing member 7 enters the inside of the second fluid chamber 2 by a predetermined distance so that the air seal 72 separates from the stepped portion 21 as illustrated in FIG. 10B.

In order that the cleaning air A securely flows to the second flow passage R2 of the second nozzle N2, a second air seal 73 in an annular form is provided between an outer surface of the second nozzle N2 and an inner surface of an end portion of the second insertion bore H2 for sealing therebetween. The second air seal 73 inhibits the cleaning air A from leaking to the outside from the second fluid chamber 2 and allows the cleaning air A at high pressure to be fully discharged via the second nozzle N2. The dust seal 6 also makes contact with an outer surface of the second nozzle N2. At this time, because the cleaning air A is inhibited from leaking from the second fluid chamber 2 by means of the second air seal 73, a case where a clearance is formed between the dust seal 6 and the second nozzle N2 and a case where a clearance is not formed are both acceptable.

According to the aforementioned construction, the cleaning air A is not discharged from the second nozzle N2 while the cleaning water W is being discharged from the first nozzle N1 in a state where each of the first nozzle N1 and the second nozzle N2 is most elongated. Thus, the discharge of the cleaning water W is not disturbed by the cleaning air A. The cleaning water W is appropriately discharged to the lens of the camera C1. Afterwards, when the supply of the cleaning water W is stopped so that the pressure of the first fluid chamber 1 decreases, the first nozzle N1 and the second nozzle N2 are started to be retracted into the casing H by means of the first spring E1a. At this time, sealing state of the second nozzle N2 by means of the air seal 72 is released.

Because the cleaning air A is accumulated and pressurized at the second fluid chamber 2 by the control of the control unit D and by the driving of the air pump Pa, the cleaning air A is discharged to the lens of the camera C1 from the second nozzle N2 when the air seal 72 is released. Accordingly, timing at which the cleaning water W is discharged and timing at which the cleaning air A is discharged are differentiated from each other, thereby securely removing the cleaning water W adhered to the lens.

In order to secure the discharge volume of the cleaning air A, the volume of the second fluid chamber 2 is desirably large. According to the construction of the sixth embodiment, the second fluid chamber 2 is utilized as a pressurized tank in a state where the second nozzle N2 is elongated. Thus, space efficiency of the casing H is basically improved. In addition to the above, a maximum inner diameter of the second fluid chamber 2 with reference to an axis X2 of the second insertion bore H2 is specified larger than the inner diameter of the second insertion bore H2 provided at the casing H. The volume of the cleaning air A stored at the second fluid chamber 2 may further increase accordingly. The sufficient volume of the cleaning air A may be discharged to the cleaning object C to thereby further improve the removal effect of the cleaning water W.

A container including a predetermined volume serving as a storage portion of the cleaning air A may be additionally provided at a lateral side of the second fluid chamber 2, for example.

The second discharge portion T2 in a cap form is provided at a tip end of the second nozzle N2. A second discharge port T2a is provided at the second discharge portion T2 so that the cleaning air A is discharged to the lens of the camera C1 through the second discharge port T2a while the second nozzle N2 is returning to the inside of the casing H. The second discharge portion T2 is provided separately from the first discharge portion T1 so that each of the cleaning water W and the cleaning air A is discharged to the cleaning object C in a state where the cleaning water W and the cleaning air A are inhibited from being mixed with each other. Thus, the cleaning water W or the cleaning air A is inhibited from being discharged at unintended timing. The discharge volume of the cleaning water W relative to the cleaning object C is securely maintained accordingly. In addition, upon removal of the cleaning water W, only the cleaning air A is discharged to thereby further increase the removal effect of the cleaning water W.

The cleaning air A is supplied to the second nozzle N2 by the air pump Pa provided in the vicinity of the casing H. Driving timing of the air pump Pa may be desirably synchronous with driving timing of the water pump Pw. At this time, the air pump Pa is driven at least in a state where the second nozzle N2 is most elongated. That is, in the aforementioned state, the second flow passage R2 is blocked or closed so that the pressure of the cleaning air A increases at the inside of the second fluid chamber 2. Therefore, at the same time the second nozzle N2 is then started to be retracted into the casing H, the cleaning air A is discharged to the camera C1.

The air pump Pa may be driven during the extending (elongating) operation of each of the first nozzle N1 and the second nozzle N2. In this case, the cleaning air A is discharged to the camera C1 before the first nozzle N1 is completely elongated. Nevertheless, the cleaning water W is not yet discharged at this time. Thus, even when the cleaning air A is discharged, the discharge of the cleaning water W is inhibited from being disturbed.

Accordingly, with a relatively simple construction, the cleaning water W and the cleaning air A may be separately discharged from each other. While the cleaning effect of the cleaning object C is enhanced, the cleaning apparatus S at a reduced cost is obtainable.

A seventh embodiment is explained with reference to FIGS. 11A and 11B. In the seventh embodiment, the first nozzle N1 and the second nozzle N2 are promptly elongated upon discharge of the cleaning water W. The first nozzle N1 and the second nozzle N2 are then gently retracted into the casing H upon discharge of the cleaning air A.

Specifically, a one-way valve 8 and the orifice 9 are disposed between the first port P1 and the first fluid chamber 1. The one-way valve 8 allows the cleaning water W to flow into the first fluid chamber 1. The orifice 9 causes the first port P1 and the first fluid chamber 1 to constantly communicate with each other.

The one-way valve 8 includes an umbrella form, for example. The one-way valve 8 is formed from any rubber material so as to be easily elastically deformable, for example. FIG. 11A illustrates a state where the cleaning water W flows into the first fluid chamber 1 from the first port P1. FIG. 11B illustrates a state where the cleaning water W is discharged from the first fluid chamber 1 to the first port P1. A shaft portion 81 of the one-way valve 8 is inserted to be positioned within the first flow passage R1 formed at the first port member PB1. At this time, an outer diameter of the shaft portion 81 is specified so that a clearance is defined relative to an inner diameter of the aforementioned first flow passage R1. A valve seat 10 with which an umbrella portion 82 of the one-way valve 8 is contactable is provided at the first port member PB1.

The position of the one-way valve 8 is secured in the vicinity of the valve seat 10 by a pressing member 11 provided at the first port member PB1. The pressing member 11 is a cruciform member or a reticulated member, for example, which is internally fitted to an inner peripheral wall of the first port member PB1. The pressing member 11 may press the one-way valve 8 against the valve seat 10 or may simply interrupt or inhibit movement of the one-way valve 8 from the vicinity of the valve seat 10 to the first fluid chamber 1. The umbrella portion 82 of the one-way valve 8 which is at least positioned in the vicinity of the valve seat 10 may exert an effect of circulating and blocking the first fluid L1.

Figure 11A:
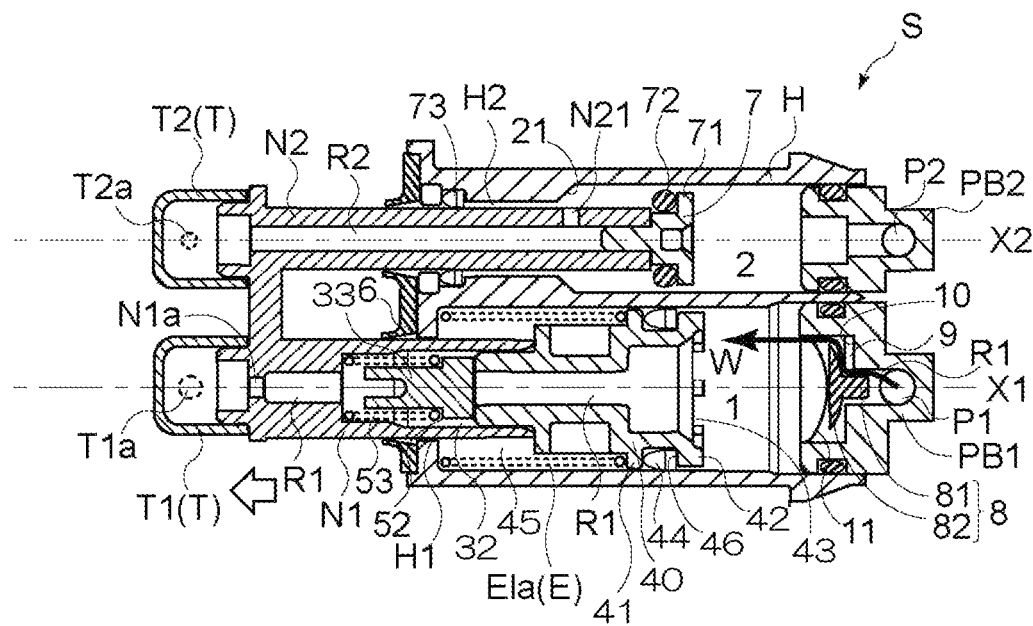
FIGS. 11A and 11B are cross-sectional views each of which illustrates the construction of the cleaning apparatus according to a seventh embodiment disclosed here.
Figure 11B:
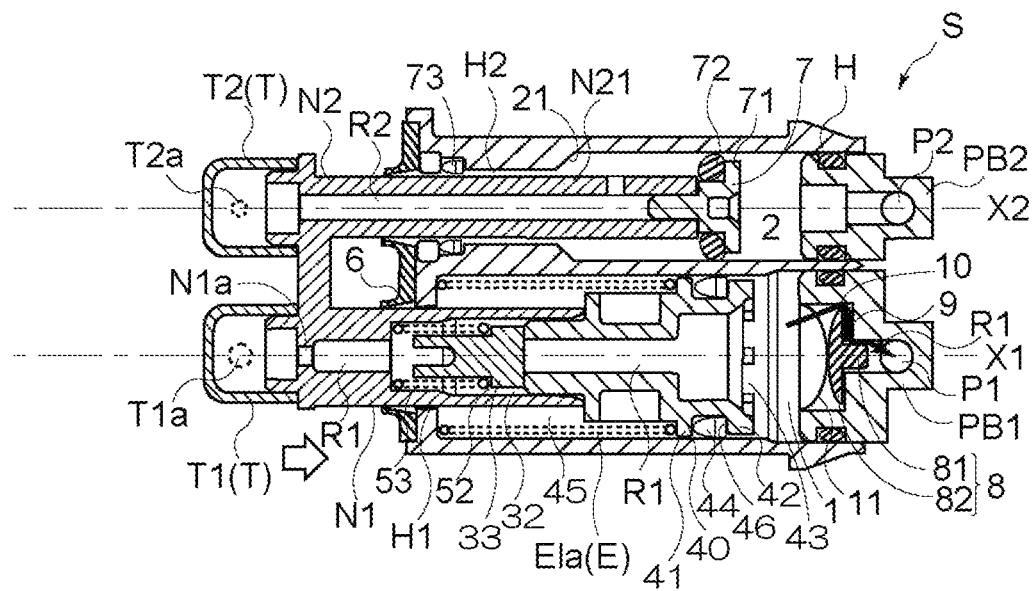

The orifice 9 in a groove form is provided at a part of the valve seat 10 as illustrated in FIGS. 11A and 11B. The orifice 9 allows communication between the first port P1 and the first fluid chamber 1 even in a state where the umbrella portion 82 of the one-way valve 8 is in contact with the valve seat 10. A flow passage area of the orifice 9 is limited to a predetermined level. Thus, the flow volume of the cleaning water W returning to the first port P1 from the first fluid chamber 1 is limited to a small volume.

Accordingly, in a case where the cleaning water W flows to the first fluid chamber 1 as illustrated in FIG. 11A, the first nozzle N1 is immediately elongated while the flow volume of the cleaning water W is secured. The cleaning water W may be promptly discharged to the cleaning object C accordingly. On the other hand, in a case where the supply of the cleaning water W to the first fluid chamber 1 is stopped, the first spring E1*a* serving as the biasing portion E pushes back the piston 40 as illustrated in FIG. 11B. The cleaning water W at the first fluid chamber 1 is discharged to the first port P via the orifice 9. Because the flow volume at this time is small, a retraction speed of the first nozzle N1 is reduced.

As a result, the second nozzle N2 is retained at a position facing the cleaning object C during a predetermined time period after the cleaning air A is started to be discharged from the second nozzle N2. The cleaning air A is widely blown to securely remove the cleaning water W adhered to the cleaning object C.

Functions of the one-way valve 8 and the orifice 9 may be provided at the piston 40. For example, an annular valve including a V-shaped cross-section may be employed as the piston seal 44 so that the cleaning water W at the first spring chamber 45 is configured to be easily discharged to the first fluid chamber 1 when the piston 40 is pushed to the extension side. On the other hand, in a case where the piston 40 is returned towards the first port P1, the cleaning water W is configured to be difficult to return to the first spring chamber 45 from the first fluid chamber 1. A moving speed when the piston 40 is pushed to the extension side and a moving speed when the piston 40 is returned to the first port P1 are differentiated from each other.

Figure 12A:
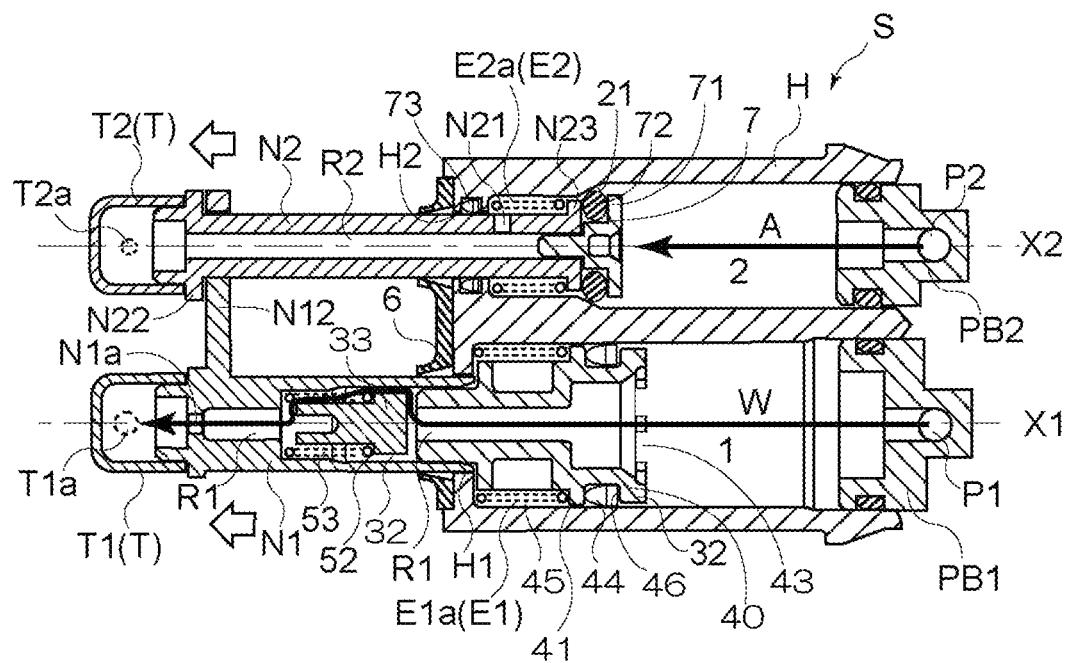
FIGS. 12A and 12B are cross-sectional views each of which illustrates the construction of the cleaning apparatus according to an eighth embodiment disclosed here.
Figure 12B:
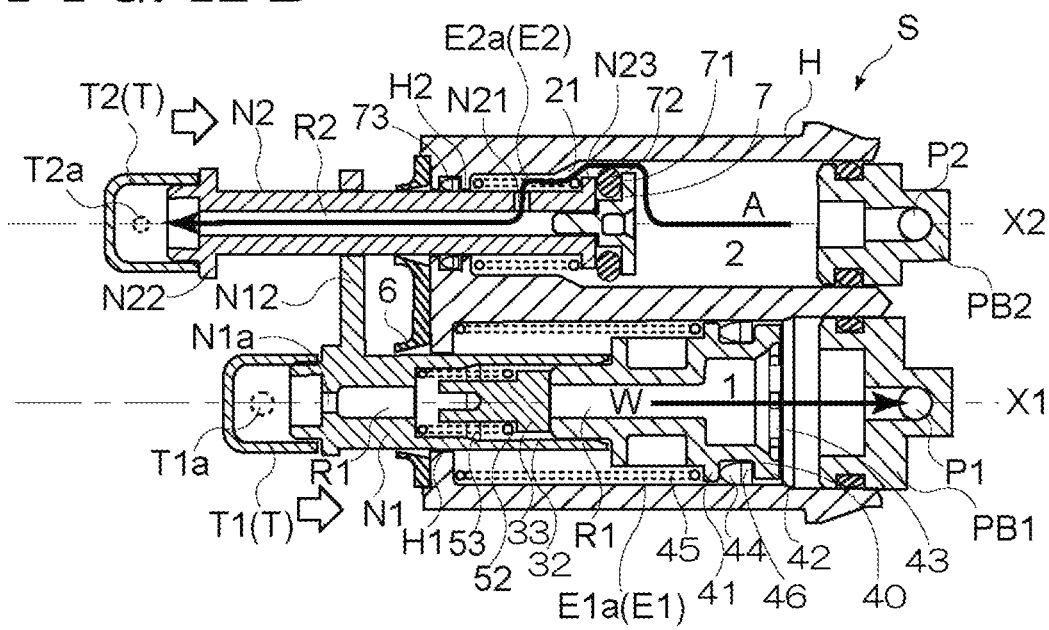

According to an eighth embodiment, the first nozzle N1 and the second nozzle N2 are retracted into the casing H at different timings from each other as illustrated in FIGS. 12A and 12B. For example, a first biasing portion E1 serving as the biasing portion E biasing the first nozzle N1 in a direction where the first nozzle N1 is retracted into the casing H and a second biasing portion E2 serving as the biasing portion E biasing the second nozzle N2 in a direction where the second nozzle N2 is retracted into the casing H are separately provided from each other. Then, a contact portion N22 is provided at the second nozzle N2 while an operation portion N12 is provided at a part of the first nozzle N1. Specifically, the contact portion N22 is configured to be pressed by the operation portion N12 in a direction where the second nozzle N2 is elongated when the first nozzle N1 is elongated. The contact portion N22 is also configured to separate from the operation portion N12 when the first nozzle N1 is retracted into the casing H.

FIG. 12A illustrates a state where the first nozzle N1 and the second nozzle N2 are elongated. In such state, the piston 40 is pushed out by the cleaning water W which flows into the first fluid chamber 1. In addition, the operation portion N12 of the first nozzle N1 makes contact with the contact portion N22 of the second nozzle N2 to thereby elongate the second nozzle N2. At this time, a second spring E2*a* serving as the second biasing portion E2 provided at the second nozzle N2 is contracted. The second spring E2*a* is a coil spring, for example, and is disposed between a second spring holder N23 provided at the end portion of the second nozzle N2 and a stepped portion formed at the end portion of the second insertion bore H2. In the state illustrated in FIG. 12A, the cleaning air A supplied from the second port P2 is inhibited from flowing to the second flow passage R2 and increases an inner pressure of the second fluid chamber 2.

FIG. 12B illustrates a state where the supply of the cleaning water W is stopped so that the first nozzle N1 which is pushed back by the first spring E1*a* is in a middle of retracting state. In such state, the second nozzle N2 is slightly retracted by the second spring E2*a* so that the air seal 72 is released. At this time, the supply of the cleaning air A from the second port P2 is desirably continued. Accordingly, even in a state where a pressing force of the first nozzle N1 is not obtained, the second nozzle N2 is brought closer to an elongated position (i.e., most elongated position, for example). A time period during which the cleaning air A is discharged may increase to thereby improve the removal effect of the cleaning water W. Afterwards, when the supply of the cleaning air A is stopped to decrease the pressure at the second fluid chamber 2, the biasing force of the second spring E2*a* further becomes dominant, which speeds up the retraction operation of the second nozzle N2.

In addition, according to the aforementioned construction, a sliding portion of the first nozzle N1 relative to the casing H and a sliding portion of the second nozzle N2 relative to the casing H are provided separately from each other. In a case where the first nozzle N1 and the second nozzle N2 each of which serves as an elongated member slide on the casing H, a degree of friction of each of the first and second nozzles N1 and N2 influences entire operation performance of the first and second nozzles N1 and N2. For example, when parallelism between the first and second nozzles N1 and N2 is insufficient in a state where the first and second nozzles N1 and N2 are integrally formed with each other, sliding resistance of each of the first and second nozzles N1 and N2 relative to the casing H increases, which may deteriorate smooth extension and retraction operation of the first and second nozzles N1 and N2. Thus, high accuracy in forming the sliding portions of the first and second nozzles N1 and N2 is necessary. The sliding portions of the first and second nozzles N1 and N2 need to be highly accurately formed.

According to the aforementioned construction, because the first nozzle N1 and the second nozzle N2 operate basically individually from each other, a dimensional difference is allowed between the extending direction (elongating direction) of the first nozzle N1 and the extending direction (elongating direction) of the second nozzle N2. Thus, finishing accuracy of the sliding portions of the first nozzle N1 and the second nozzle N2 is eased so that the cleaning apparatus S may be efficiently obtained.

In order to cause the air at the first spring chamber 45 to communicate with the outside, an air hole may be provided at a portion which forms the first spring chamber 45 in a wall portion of the casing H, for example.

According to the aforementioned construction, a clearance is not necessary between the outer surface of the first nozzle N1 and the dust seal 6. As a result, a foreign substance may be securely inhibited from entering the first spring chamber 45 upon reciprocation of the first nozzle N1.

The first discharge portion T1 and the second discharge portion T2 (the first discharge port T1a and the second discharge port T2a) which are separately provided as illustrated in FIG. 8 may be formed as the common discharge port T. In this case, the cleaning water W which remains in the vicinity of the discharge port T may be simultaneously discharged when the cleaning air A is discharged. Nevertheless, an external configuration of a combination of the first nozzle N1 and the second nozzle N2 may be simplified.

With the aforementioned construction, in order to inhibit one of the cleaning water W and the cleaning air A from entering the flow passage of the other of the cleaning water W and the cleaning air A, a check valve 12 may be provided at a tip end portion of each of the first flow passage R1 and the second flow passage R2.

The first flow passage R1 and the second flow passage R2 may be constantly open in a state where the valve element 33 or the air seal 72 is not provided. In this case, a cross-sectional area of the second flow passage R2 may be configured to be slightly smaller than a cross-sectional area of the first flow passage R1 so as to secure the discharge pressure of the cleaning air A including small flow resistance.

With the aforementioned construction, the cleaning water W and the cleaning air A are discharged in conjunction with driving start of the water pump Pw and the air pump Pa, which may disturb or destabilize a discharge direction of the cleaning water W. Nevertheless, at least a part of the cleaning water W is jetted out to the cleaning object C, so that certain cleaning effect may be expected. In this case, end timing of discharge of the cleaning air A may be delayed from end timing of discharge of the cleaning water W to securely remove the cleaning water W.

In each of the aforementioned embodiments, any fluid may be employed for the first fluid L1 and the second fluid L2 other than the cleaning water W and the cleaning air A. For example, a mixture of the cleaning water W and the cleaning air A may be employed. In addition, the cleaning air A may be employed for a drive source which elongates both the first and second nozzles.

The cleaning apparatus according to the aforementioned embodiments is widely applicable to remove fluid by jetting gas after discharging the fluid to a cleaning object.

According to the aforementioned embodiments, the cleaning apparatus S includes the cleaning nozzle N, N1 (fluid discharge portion) discharging the cleaning water W (fluid) to the cleaning object C, the cleaning nozzle N, N2 (gas discharge portion) jetting the cleaning air A (gas) to the cleaning object C, the water tank Tw (fluid tank) storing the cleaning water W, the water pump Pw (fluid pump) supplying the cleaning water W stored at the water tank Tw to the cleaning nozzle N, N1 via the water passage Rw (fluid passage), the air pump Pa (gas pump) supplying the cleaning air A to the cleaning nozzle N, N2 via the air passage Ra (gas passage), the control unit D controlling a driving state of each of the water pump Pw and the air pump Pa, the housing 31 at which a part of the water passage Rw and a part of the air passage Ra are provided, and the valve element 33 held at an inside of the housing 31 and being switchable between the closed position at which the air passage Ra is blocked and the open position at which the air passage Ra is opened, the valve element 33 including the first surface 33a which faces the water passage Rw to receive a water pressure from the water passage Rw in a direction where the valve element 33 is brought to the closed position and including the second surface 33b which faces the air passage Ra to receive an air pressure from the air passage Ra in a direction where the valve element 33 is brought to the open position in a state where the valve element 33 is disposed at the closed position.

Accordingly, the position of the valve element 33 may be changed by the pressure of the cleaning water W and the pressure of the cleaning air A in a case where the cleaning water W is discharged to the cleaning object C or the cleaning air A is jetted out to the cleaning object C. Thus, an electromagnetic valve for switching the position of the valve element 33, for example, is not necessary, which may obtain the cleaning apparatus S with a simple construction and small entire dimensions.

In addition, according to the embodiments, the control unit D drives the air pump Pa prior to a driving stop of the water pump Pw.

Because of the cleaning air A which is compressed, a jetting speed of the cleaning air A increases, so that the cleaning water W adhered to the cleaning object C is securely removed.

Further, according to the third embodiment, the cleaning apparatus S also includes the air tank Ta provided between the air pump Pa and the valve element 33 for storing pressurized cleaning air A.

Because of the air tank Ta, a large amount of pressurized cleaning air A may be stored, which further improves effect for removing the cleaning water W.

According to the embodiments, the water passage Rw and the air passage Ra are arranged side by side at the inside of the housing 31. The valve element 33 is movable in a reciprocating manner in a direction intersecting with an extending direction of each of the water passage Rw and the air passage Ra along the inner surface of the valve element housing portion 32 provided between the water passage Rw and the air passage Ra. The first surface 33a and the second surface 33b are provided at opposed end portions of the valve element 33 along a direction where the valve element 33 is movable in a reciprocating manner.

Because the water passage Rw and the air passage Ra are arranged side by side within the housing 31 in a state where the valve element 33 which moves in a reciprocating manner is disposed at a substantially middle position between the water passage Rw and the air passage Ra so that the pressure of the cleaning water W and the pressure of the cleaning air A are separately applied to the first surface 33a and the second surface 33b respectively, the first surface 33a and the second surface 33b being provided at the opposed ends of the valve element 33, the water passage Rw, the air passage Ra and the valve element 33 may be effectively arranged at the inside of the single housing 31. The cleaning apparatus S where the valve element 33 performs a smooth reciprocating movement is obtainable.

In addition, because the pressure of the cleaning water W and the pressure of the cleaning air A are separately applied to the first surface 33a and the second surface 33b respectively, the first surface 33a and the second surface 33b being opposed to each other at the valve element 33, a simple valve construction without a particular biasing member is obtainable.

According to the second embodiment, the valve element 33 is provided with the biasing portion E biasing the valve element 33 in a direction where the valve element 33 is brought to the open position.

Because of the aforementioned construction where the valve element 33 is biased to the open position, the valve element 33 is immediately movable to the open position because of a biasing force of the biasing portion E added to a pressing force of the cleaning air A when a driving of the water pump Pw is stopped to decrease the pressure of the cleaning water W. Thus, a function of the cleaning object C which is deteriorated because of its stained state may be promptly recovered.

Further, because the valve element 33 moves promptly to the open position, the cleaning air A may be jetted out before dropping of the cleaning water W which is previously discharged to the cleaning object C. Thus, the cleaning water W is inhibited from remaining at the cleaning object C, which may lead to a further secure cleaning operation.

According to the fifth embodiment, the valve element 33 is constituted by the diaphragm 35 including a first surface which faces the water passage Rw and a second surface which faces the air passage Ra.

The diaphragm 35 is deformed depending on a pressure difference between the pressure of the cleaning water W and the pressure of the cleaning air A applied to respective opposed surfaces of the diaphragm 35. Such deformation of the diaphragm 35 may correspond to at least a small opening of the diaphragm 35 from its closed position. A volume of a void which houses the diaphragm 35 while allowing deformation of the diaphragm 35 may be small. Thus, the cleaning apparatus S with small external dimensions and improved mountability is obtainable.

According to the embodiments, the control unit D simultaneously turns on the water pump Pw and the air pump Pa for driving the cleaning apparatus S and simultaneously turns off the water pump Pw and the air pump Pa for stopping the driving of the cleaning apparatus S.

In order to increase strength and volume of the jetted cleaning air A, the air pump Pa is necessarily driven prior to jetting of the cleaning air A. Timing at which the air pump Pa is driven (i.e., driving start timing) may be appropriately decided on a basis of removal effect of the cleaning water W which remains at the surface of the cleaning object C and specified on a basis of capability of the air pump Pa. At this time, it is easy to control driving of both the water pump Pw and the air pump Pa in a case where the air pump Pa is started to be driven simultaneously with the driving start timing of the water pump Pw. Even in this case, the pressure of the cleaning air A may increase until the driving of the water pump Pw is finished. Thus, the cleaning apparatus S which is easily controlled while the removal effect of the cleaning water W by the cleaning air A is secured is obtainable.

According to the sixth embodiment, the cleaning apparatus S includes the casing H, the first port P1 receiving the first fluid L1, the second port P2 receiving the second fluid L2, the first fluid chamber 1 provided at the casing H and including a tubular form, the piston 40 configured to slide along the inner surface of the first fluid chamber 1 in a state being pressed by the first fluid L1 which flows into the first fluid chamber 1 from the first port P1, the first nozzle N1 integrally provided with the piston 40 and including the first flow passage R1 through which the first fluid L1 flows and the discharge portion T, T1 discharging the first fluid L1 to the cleaning object C, the first nozzle N1 being configured to extend and retract relative to the casing H, the second fluid chamber 2 provided at the casing H, the second nozzle N2 including the second flow passage R2 through which the second fluid L2 that is received from the second fluid chamber 2 flows and the discharge portion T, T2 discharging the second fluid L2 to the cleaning object C, the second nozzle N2 being configured to extend and retract relative to the casing H and extending together with the first nozzle N1 when the first nozzle N1 extends from the casing H, and the biasing portion E, E1a biasing at least one of the first nozzle N1 and the second nozzle N2 in a direction where at least the one of the first nozzle N1 and the second nozzle N2 is retracted into the casing H, the piston 40 within which the first flow passage R1 is provided, the first flow passage R1 extending from the first fluid chamber 1 to the first nozzle N1.

Accordingly, the first nozzle N1 and the second nozzle N2 extend relative to the casing H by the pressure of the first fluid L1. Thus, an extension mechanism of each of the nozzles N1 and N2 is simply constructed. Specifically, because the first flow passage L1 is provided at the inside of the piston 40 for supplying the first fluid L1 from the first fluid chamber 1 at the casing H to the first nozzle N1, an arrangement of the first flow passage R1 may be simplified, which leads to a wide range of application of the cleaning apparatus S in view of mountability thereof.

According to the sixth embodiment, the cleaning apparatus S further includes the blocking portion 71 arranged between the casing H and the second nozzle N2, the blocking portion 71 interrupting a communication between the second fluid chamber 2 and the second flow passage R2 in a case where the second nozzle N2 is positioned in a predetermined range from an end point at an extension side of the second nozzle N2.

Because of the aforementioned blocking portion 71, the inner pressure of the second fluid chamber 2 increases by the second fluid L2 which flows from the second port P2 in a case where the second nozzle N2 is disposed at a predetermined position at the extension side. Afterwards, when the supply of the first fluid L1 is stopped so that the first nozzle N1 moves to a retraction side thereof, an extension operation of the second nozzle N2 caused by the first nozzle N1 is released, so that the second nozzle N2 also moves to a retraction side thereof. As a result, a blocking function of the blocking portion 71 is released, so that the second fluid L2 at the second fluid chamber 2 is powerfully or strongly discharged or jetted via the second nozzle N2. Therefore, a jetting speed of the second fluid L2 to the cleaning object C increases, which increases the removal effect of the first fluid L1.

According to the sixth embodiment, the casing H includes the second insertion bore H2 into which the second nozzle N2 is inserted to be positioned in an extendable and retractable manner relative to the casing H. The second fluid chamber 2 includes a maximum inner diameter with reference to an axis of the insertion bore H2, the maximum inner diameter being greater than an inner diameter of the insertion bore H2.

The second fluid chamber 2 includes a predetermined length along an extending direction of an axis of the insertion bore H2 so that the second nozzle N2 is extendable and retractable relative to the insertion bore H2. Then, because the maximum inner diameter of the second fluid chamber 2 is specified greater than the inner diameter of the insertion bore H2, the volume of the second fluid chamber 2 may be secured to be large. As a result, the volume of the second fluid L2 pressurized and stored at the second fluid chamber 2 increases, which further improves the removal effect of the first fluid L1 adhered to the cleaning object C.

According to the seventh embodiment, the cleaning apparatus S further includes the one-way valve 8 provided between the first port P1 and the first fluid chamber 1 to allow the first fluid L1 to flow into the first fluid chamber 1 and the orifice 9 provided between the first port P1 and the first fluid chamber 1 to constantly allow a communication between the first port P1 and the first fluid chamber 1.

Accordingly, the flow volume of the first fluid L1 is secured via the one-way valve 8 to promptly extend the first nozzle N1. The first fluid L1 may be promptly discharged to the cleaning object C accordingly. On the other hand, in a case where the supply of the first fluid L1 to the first fluid chamber 1 is stopped, the biasing portion E pushes back the piston 40 so that the first fluid L1 at the first fluid chamber 1 is discharged to the first port P1 via the orifice 9. A contraction speed of the first nozzle N1 is reduced accordingly. Because a contraction speed of the second nozzle N2 is also reduced, the second nozzle N2 is retained at a position facing the cleaning object C during a predetermined time period after the second fluid L2 is started to be discharged from the second nozzle N2. The first fluid L1 adhered to the cleaning object C may be securely removed.

According to the sixth to eighth embodiments, the discharge portion T includes the first discharge portion T1 provided at a tip end of the first nozzle N1 and the second discharge portion T2 provided at a tip end of the second nozzle N2, the first discharge portion T1 and the second discharge portion T2 being separately provided from each other.

Accordingly, each of the first fluid L1 and the second fluid L2 may be discharged to the cleaning object C in a state where the first fluid L1 and the second fluid L2 are substantially completely inhibited from being mixed with each other. Thus, the first fluid L1 or the second fluid L2 is inhibited from being discharged at unintended timing. The discharge volume of the first fluid L1 relative to the cleaning object C is securely maintained accordingly. In addition, upon removal of the first fluid L1, only the second fluid L2 is discharged to thereby further increase the removal effect of the first fluid L1.

According to the eighth embodiment, the biasing portion E includes the first biasing portion E1a biasing the first nozzle N1 and the second biasing portion E2a biasing the second nozzle N2, the first biasing portion E1a and the second biasing portion E2a being separately provided from each other. The first nozzle N1 includes the operation portion N12 provided at a part of the first nozzle N1. The second nozzle N2 includes the contact portion N22 configured to be pressed in a direction where the second nozzle N2 extends from the casing H in a case where the first nozzle N1 extends from the casing H, the contact portion N22 being configured to separate from the operation portion N12 in a case where the first nozzle N1 is retracted into the casing H.

Accordingly, a sliding portion of the first nozzle N1 relative to the casing H and a sliding portion of the second nozzle N2 relative to the casing H are provided separately from each other. In a case where the first nozzle N1 and the second nozzle N2 each of which serves as an elongated member slide on the casing H, a degree of friction of each of the first and second nozzles N1 and N2 influences entire operation performance of the first and second nozzles N1 and N2. For example, when parallelism between the first and second nozzles N1 and N2 is insufficient in a state where the first and second nozzles N1 and N2 are integrally formed with each other, sliding resistance of each of the first and second nozzles N1 and N2 relative to the casing H increases, which may deteriorate smooth extension and retraction operation of the first and second nozzles N1 and N2. Nevertheless, in the present construction, the first nozzle N1 and the second nozzle N2 operate individually from each other. Thus, a dimensional difference is allowed between the extending direction of the first nozzle N1 and the extending direction of the second nozzle N2. A process for forming each of the first nozzle N1 and the second nozzle N2 is simplified so that the cleaning apparatus S is efficiently obtainable.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A cleaning apparatus comprising:
a fluid discharge portion discharging fluid to a cleaning object;
a gas discharge portion jetting gas to the cleaning object;
a fluid tank storing fluid;
a fluid pump supplying the fluid stored at the fluid tank to the fluid discharge portion via a fluid passage;
a gas pump supplying gas to the gas discharge portion via a gas passage;
a control unit controlling a driving state of each of the fluid pump and the gas pump;
a housing at which a part of the fluid passage and a part of the gas passage are provided; and
a valve element held at an inside of the housing and being switchable between a closed position at which the gas passage is blocked and an open position at which the gas passage is opened, the valve element including a first surface which faces the fluid passage to receive a fluid pressure from the fluid passage in a direction where the valve element is brought to the closed position and including a second surface which faces the gas passage to receive a gas pressure from the gas passage in a direction where the valve element is brought to the open position in a state where the valve element is disposed at the closed position.

2. The cleaning apparatus according to claim 1, wherein the control unit drives the gas pump prior to a driving stop of the fluid pump.

3. The cleaning apparatus according to claim 1, further comprising a gas tank provided between the gas pump and the valve element for storing pressurized gas.

4. The cleaning apparatus according to claim 1, wherein
the fluid passage and the gas passage are arranged side by side at the inside of the housing,
the valve element is movable in a reciprocating manner in a direction intersecting with an extending direction of each of the fluid passage and the gas passage along an inner surface of a valve element housing portion provided between the fluid passage and the gas passage,
the first surface and the second surface are provided at opposed end portions of the valve element along a direction where the valve element is movable in a reciprocating manner.

5. The cleaning apparatus according to claim 1, wherein the valve element is provided with a biasing portion biasing the valve element in a direction where the valve element is brought to the open position.

6. The cleaning apparatus according to claim 1, wherein the valve element is constituted by a diaphragm including a first surface which faces the fluid passage and a second surface which faces the gas passage.

7. The cleaning apparatus according to claim 1, wherein the control unit simultaneously turns on the fluid pump and the gas pump for driving the cleaning apparatus and simultaneously turns off the fluid pump and the gas pump for stopping the driving of the cleaning apparatus.

8. A cleaning apparatus comprising:
a casing;
a first port receiving a first fluid;
a second port receiving a second fluid;
a first fluid chamber provided at the casing and including a tubular form;
a piston configured to slide along an inner surface of the first fluid chamber in a state being pressed by the first fluid which flows into the first fluid chamber from the first port;
a first nozzle integrally provided with the piston and including a first flow passage through which the first fluid flows and a discharge portion discharging the first fluid to a cleaning object, the first nozzle being configured to extend and retract relative to the casing;
a second fluid chamber provided at the casing;
a second nozzle including a second flow passage through which the second fluid that is received from the second fluid chamber flows and a discharge portion discharging the second fluid to the cleaning object, the second nozzle being configured to extend and retract relative to the casing and extending together with the first nozzle when the first nozzle extends from the casing; and
a biasing portion biasing at least one of the first nozzle and the second nozzle in a direction where at least the one of the first nozzle and the second nozzle is retracted into the casing,
the piston within which the first flow passage is provided, the first flow passage extending from the first fluid chamber to the first nozzle.

9. The cleaning apparatus according to claim 8, further comprising a blocking portion arranged between the casing and the second nozzle, the blocking portion interrupting a communication between the second fluid chamber and the second flow passage in a case where the second nozzle is positioned in a predetermined range from an end point at an extension side of the second nozzle.

10. The cleaning apparatus according to claim 8, wherein
the casing includes an insertion bore into which the second nozzle is inserted to be positioned in an extendable and retractable manner relative to the casing,
the second fluid chamber includes a maximum inner diameter with reference to an axis of the insertion bore, the maximum inner diameter being greater than an inner diameter of the insertion bore.

11. The cleaning apparatus according to claim 8, further comprising:
a one-way valve provided between the first port and the first fluid chamber to allow the first fluid to flow into the first fluid chamber; and
an orifice provided between the first port and the first fluid chamber to constantly allow a communication between the first port and the first fluid chamber.

12. The cleaning apparatus according to claim 8, wherein the discharge portion includes a first discharge portion provided at a tip end of the first nozzle and a second discharge portion provided at a tip end of the second nozzle, the first discharge portion and the second discharge portion being separately provided from each other.

13. The cleaning apparatus according to claim 8, wherein
the biasing portion includes a first biasing portion biasing the first nozzle and a second biasing portion biasing the second nozzle, the first biasing portion and the second biasing portion being separately provided from each other,
the first nozzle includes an operation portion provided at a part of the first nozzle,
the second nozzle includes a contact portion configured to be pressed in a direction where the second nozzle extends from the casing in a case where the first nozzle extends from the casing, the contact portion being configured to separate from the operation portion in a case where the first nozzle is retracted into the casing.

* * * * *